(12) United States Patent
Terashita (10) Patent No.: US 6,850,272 B1
(45) Date of Patent: Feb. 1, 2005

(54) IMAGE PROCESSING METHOD AND SYSTEM

(75) Inventor: Takaaki Terashita, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/265,536

(22) Filed: Mar. 9, 1999

(30) Foreign Application Priority Data

Mar. 9, 1998 (JP) .......................................... 10/056629
Apr. 17, 1998 (JP) .......................................... 10/107705

(51) Int. Cl.[7] .......................... H04N 9/73; H04N 1/46; G06K 9/00; G03B 27/72

(52) U.S. Cl. ............................... 348/223.1; 348/222.1; 348/207.1; 348/207.2; 358/504; 358/518; 358/520; 358/521; 382/162; 382/167; 382/169; 355/35; 355/38; 355/77

(58) Field of Search ............................ 358/520, 521, 358/504, 518; 382/169, 270, 272, 274, 275, 162, 167; 348/222.1, 223.1, 272, 207.1, 207.2; 355/32, 35, 38, 67, 68, 77

(56) References Cited

U.S. PATENT DOCUMENTS

| | | | |
|---|---|---|---|
| 2,571,697 A | * 10/1951 | Evans ........................ 430/30 |
| 4,203,671 A | 5/1980 | Takahashi et al. .......... 356/402 |
| 4,602,277 A | * 7/1986 | Guichard ................. 348/228.1 |
| 4,884,102 A | * 11/1989 | Terashita ..................... 355/77 |
| 4,941,192 A | * 7/1990 | Mishima et al. ............ 382/195 |
| 4,974,017 A | * 11/1990 | Terashita ..................... 355/38 |
| 4,975,970 A | * 12/1990 | Zettel et al. ................ 382/131 |
| 5,003,616 A | * 3/1991 | Orita et al. ................. 382/282 |
| 5,081,485 A | * 1/1992 | Terashita ..................... 355/38 |
| 5,117,293 A | 5/1992 | Asada et al. ................ 358/298 |
| 5,121,446 A | * 6/1992 | Yamada et al. ............. 382/272 |
| 5,162,841 A | * 11/1992 | Terashita ..................... 355/38 |
| 5,278,921 A | 1/1994 | Nakamura et al. ........... 382/18 |
| 5,281,995 A | * 1/1994 | Terashita et al. ............. 355/68 |
| 5,347,374 A | 9/1994 | Fuss et al. .................. 358/522 |
| 5,426,517 A | * 6/1995 | Schwartz .................... 358/520 |
| 5,479,537 A | * 12/1995 | Hamashima et al. ........ 382/266 |
| 5,561,494 A | * 10/1996 | Terashita ..................... 355/38 |
| 5,619,347 A | * 4/1997 | Taniguchi et al. .......... 358/516 |
| 5,629,752 A | 5/1997 | Kinjo .......................... 355/35 |
| 6,115,150 A | * 9/2000 | Nakamura et al. .......... 358/521 |

* cited by examiner

*Primary Examiner*—Andrew Christensen
*Assistant Examiner*—Brian Genco
(74) *Attorney, Agent, or Firm*—Morgan Lewis & Bockius LLP (57) ABSTRACT

An image processing method for image-processing digital image data acquired by a digital camera to enable reproduction of high-quality images includes the steps of computing first characteristic values characterizing colors of an image represented by digital image data, normalizing the digital image data based on the first characteristic values to produce normalized image data, computing from the normalized image data a second characteristic value characterizing density of the image represented by the digital image data, and correcting the normalized image data based on the second characteristic value to produce processed image data. Also provided is an image processing system for carrying out the method.

26 Claims, 4 Drawing Sheets

IMAGE PROCESSING METHOD AND SYSTEM

BACKGROUND OF THE INVENTION

1. Field of the Invention

This invention relates to an image processing method and image processing system for image-processing digital image data acquired by a digital camera.

2. Description of the Related Art

The digital electronic still camera (hereinafter "digital camera") is internally equipped with a memory, IC card or other such recording medium for storing photographed images as digital image data. The photographed images can be printed by a printer or displayed on a monitor using the recorded digital image data. The images obtained by printing images acquired with a digital camera in this manner should desirably be of a high quality comparable to those printed from negative film.

On the other hand, a common practice has been to convert a negative film image to digital image data, normalize the image data using normalization conditions determined beforehand, and then use the normalized image data to determine the exposure when photographing a subject image on negative film. This technique is adopted because, among the characteristics of negative film, the three-color balance varies with the negative density and this variation causes the gray of the subject to exhibit a different balance in the negative image. The conditions of the three color densities of the gray are therefore determined and used for conversion (normalization) and the converted image data are used to decide the exposure. Further, in the case of using a print-making process scanner to color-separate a color original image, converting the separated colors to screen dot signals and using the screen dot signals to conduct image printing, the color-separation conditions are corrected to obtain a printed image of appropriate color, density and gradation. Japanese Unexamined Patent Publication No.3(1991)-219777 teaches a method for generating a normalization curve for conducting the correction automatically. This method determines a reference density point for each color component based on the densities of highlight and shadow portions in the original image, generates a gradation conversion curve (normalization curve) to give the density values prescribed signal levels, and corrects the color-separation conditions by using the gradation conversion curve to convert the image data. The distribution of density values of the light portions and dark portions and the tint of the image data can be corrected by this conversion.

Since the digital camera has autowhite balance (AWB) capability, autoexposure (AE) capability and image processing capability, digital image data acquired with the digital camera can be reproduced as a visible image by a printer or other reproduction unit without further processing. However, the AWB and AE capabilities perform differently in different cameras. Moreover, some cameras lack one or both of these features. The reproduction unit is therefore unable to produce printed images of consistent quality.

In light of this, it might be considered helpful to correct the digital image data as taught by JP-A-3-219777 mentioned above. There is, however, no assurance that the digital image data were acquired with the digital camera under proper exposure conditions and, moreover, the shadow portion image information is coarse owing to its high noise content. It is therefore not possible to reproduce high-quality images using digital image data read from an original image or a negative film photographed under proper exposure conditions as a print original and merely corrected by the conventional method.

SUMMARY OF THE INVENTION

This invention was accomplished in light of the foregoing problems and has as one of its objects to provide an image processing method for obtaining high-quality reproduced images by correcting image data acquired with a digital camera. Another object of the invention is to provide an image processing system for implementing the method.

A first aspect of the invention provides an image processing method for image-processing digital image data acquired by a digital camera comprising the steps of:

computing first characteristic values characterizing colors of an image represented by digital image data, normalizing the digital image data based on the first characteristic values to produce normalized image data, computing from the normalized image data a second characteristic value characterizing density of the image represented by the digital image data, and correcting the normalized image data based on the second characteristic value to produce processed image data.

A second aspect of the invention provides an image processing method for image-processing digital image data acquired by a digital camera comprising the steps of:

computing first characteristic values characterizing colors of an image represented by digital image data, normalizing the digital image data based on the first characteristic values to produce normalized image data, computing from the normalized image data a second characteristic value characterizing density of the image represented by the digital image data, correcting the digital image data based on the first and second characteristic values to produce processed image data.

The "first characteristic values" characterize the colors of the image represented by the digital image data. They can be selected from among various values including, for example, mean values of the digital image data, weighted mean values based on a weighting coefficient decided from colors of the pixels of the digital image data, mean values or weighted mean values of rough image data generated by removing pixels from the digital image data, mean values obtained by generating a color coordinate system from RGB color signals of the digital image data and decreasing the weighting coefficient with increasing color saturation, mean values obtained by decreasing the weighting coefficient with increasing distance from the origin of a color coordinate system or from a color temperature locus, mean values taking lightness into account, mean values whose weighting coefficient is varied according to the subject or scene, and mean values of an image portion corresponding to the skin, particularly the face, of a person who is the main subject.

By "normalizing the digital image data based on the first characteristic values to produce normalized image data" is meant the process of converting the three (RGB) color signals corresponding to gray subject color in the image represented by the digital image data to equal values, i.e., so that they become gray in the digital image data. This color-corrects the digital image data.

The "second characteristic value" characterizes the density of the image represented by the digital image data. The second characteristic value can be computed from the normalized image data or from normalized rough image data generated by removing pixels from the normalized image data.

By "correcting the normalized image data based on the second characteristic value" is meant the process of using the second characteristic value to compute a correction value that gives the normalized image data the desired density value and using the correction value to correct the normalized image data.

The second characteristic value is preferably the mean value of selected image data corresponding to a main image portion of the image represented by the digital image data.

By "main image portion" is meant the portion in the image that should be corrected to the most appropriate density, such as the center portion (since the main subject is usually photographed at the center portion), a human face portion, or the like.

The "selected image data" can be obtained by simply extracting the main image portion from the normalized image data or instead by setting a weighting coefficient that increases with increasing importance of the image portion in the normalized image data and multiplying the normalized image data by the weighting coefficient.

The processed image data can be further corrected based on a reproduction target value representing a characteristic of the reproduction unit for reproducing the digital image data.

The value referred to in the phrase "corrected based on a reproduction target value representing a characteristic of the reproduction unit" is one for ensuring that the reproduction unit appropriately reproduces the reference value of the digital image data. For example, if the reference values of the RGB signal values are (255, 255, 255) (in the case of 8 bits), the reproduction target value is white and correction is effected to make the reference value white.

A third aspect of the invention provides an image processing method for image-processing digital image data acquired by a digital camera comprising the steps of:

generating rough image data by removing pixels from digital image data, defining color correction values by computing first characteristic values characterizing colors of an image represented by the rough image data, normalizing the rough image data based on the color correction values to produce normalized rough image data, defining a density correction value by computing from the normalized rough image data a second characteristic value characterizing density of the image represented by the digital image data, and correcting the digital image data based on the color correction values and the density correction value to produce processed image data.

In the image processing method according to the third aspect, the first characteristic values are preferably mean values of the rough image data or weighted mean values based on a weighting coefficient decided from the colors in the pixels of the rough image data.

The second characteristic value is preferably a mean value of selected image data corresponding to a main image portion in the image represented by the rough image data.

As in the image processing methods according to the first and second aspects, the processed image data are preferably further corrected based on a reproduction target value representing a characteristic of the reproduction unit for reproducing the digital image data.

A fourth aspect of the invention provides an image processing system for image-processing digital image data acquired by a digital camera comprising:

a first characteristic value computing unit for computing first characteristic values characterizing colors of an image represented by digital image data, a normalizing unit for normalizing the digital image data based on the first characteristic values to produce normalized image data, a second characteristic value computing unit for computing from the normalized image data a second characteristic value characterizing density of the image represented by the digital image data, and a correcting unit for correcting the normalized image data based on the second characteristic value to produce processed image data.

A fifth aspect of the invention provides an image processing system for image-processing digital image data acquired by a digital camera comprising:

a first characteristic value computing unit for computing first characteristic values characterizing colors of an image represented by digital image data, a normalizing unit for normalizing the digital image data based on the first characteristic values to produce normalized image data, a second characteristic value computing unit for computing from the normalized image data a second characteristic value characterizing density of the image represented by the digital image data, and a correcting unit for correcting the digital image data based on the first and second characteristic values to produce processed image data.

The first characteristic value computing unit can be a unit for computing the first characteristic values from rough image data generated by removing pixels from the digital image data and the second characteristic value computing unit can be a unit for computing the second characteristic value from normalized rough image data generated by removing pixels from the normalized image data.

Further, the first characteristic value computing unit can be a unit for computing the first characteristic values as mean values of the digital image data or a unit for computing the first characteristic values as weighted mean values based on a weighting coefficient decided from colors of the pixels of the digital image data.

The second characteristic value computing unit can be a unit for computing the second characteristic value as the mean value of selected image data corresponding to a main image portion of the image represented by the digital image data.

The image processing systems according to the fourth and fifth aspects are preferably additionally provided with a unit for further correcting the processed image data based on a reproduction target value representing a characteristic of the reproduction unit for reproducing the digital image data.

A sixth aspect of the invention provides an image processing system for image-processing digital image data acquired by a digital camera comprising:

a rough image data generator for generating rough image data by removing pixels from the digital image data, a color correction value defining unit for defining color correction values by computing first characteristic values characterizing colors of an image represented by the rough image data, a normalizing unit for normalizing the rough image data based on the color correction values to produce normalized rough image data, a density correction value defining unit for defining a density correction value by computing from the normalized rough image data a second characteristic value characterizing density of the image represented by the digital image data, and a correcting unit for correcting the digital image data based on the color correction values and the density correction value to produce processed image data.

In the image processing system according to the sixth aspect, the color correction value defining unit can be a unit for computing the first characteristic values as mean values of the rough image data or a unit for computing the first characteristic values as weighted mean values based on a weighting coefficient decided from colors of the pixels of the rough image data.

The second characteristic value computing unit can be a unit for computing the second characteristic value as the mean value of selected image data corresponding to a main image portion of the image represented by the rough image data.

The image processing system according to the sixth aspect is preferably additionally provided with a unit for correcting the processed image data based on a reproduction target value representing a characteristic of the reproduction unit for reproducing the digital image data.

The image processing method and the image processing system according to the first and fourth aspects compute first characteristic values of the digital image data and normalize the digital image data based on the first characteristic values to color-correct the digital image data and produce normalized image data. They then compute from the normalized image data a second characteristic value characterizing density of the image represented by the digital image data. Since the normalized image data have been normalized, an appropriate second characteristic value can be produced that is unaffected by the colors of the image represented by the digital image data. Next, based on the second characteristic value, they compute a correction value that gives the normalized image data the desired density value and correct the normalized image data with the correction value to produce processed image data.

The image processing method and the image processing system according to the second and fifth aspects correct the digital image data based on the first characteristic values and the second characteristic value to produce processed image data.

By this, the digital image data are first color-corrected by normalization and are then corrected by the second characteristic value so as to be reproduced to have the desired density value. An image with the desired colors and density can therefore be reproduced from the processed image data.

A particular advantage of the image processing methods according to the first and second aspects and the image processing systems according to fourth and fifth aspects is their ability to overcome problems that tend to arise owing to differences in the type and amount of image processing effected by different makes and models of digital cameras. Specifically, since the digital image data are normalized by the first characteristic values, an image having the desired colors and density can always be reproduced irrespective of the completeness of the processing effected on the digital image data in the digital camera. This makes it possible to consistently produce high-quality reproduced images.

Moreover, if the first characteristic values are computed from rough image data generated by removing pixels from the digital image data and the second characteristic value is computed from normalized rough image data generated by removing pixels from the normalized image data, the time for computing the first and second characteristic values can be shortened to speed up the image processing.

The image processing method and the image processing system according to the third and sixth aspects define the color correction values by computing the first characteristic values from rough image data, define the density correction value by computing the second characteristic value from normalized rough image data, and correct the digital image data based on the color correction values and the density correction value. Therefore, the time for computing the first and second characteristic values can be shortened and, as in the case of the image processing methods according to the first and second aspects and the image processing systems according to the fourth and fifth aspects, an image with the desired colors and density can be reproduced.

PREFERRED EMBODIMENTS OF THE INVENTION

Embodiments of the invention will now be explained with reference to the drawings.

Figure 1:
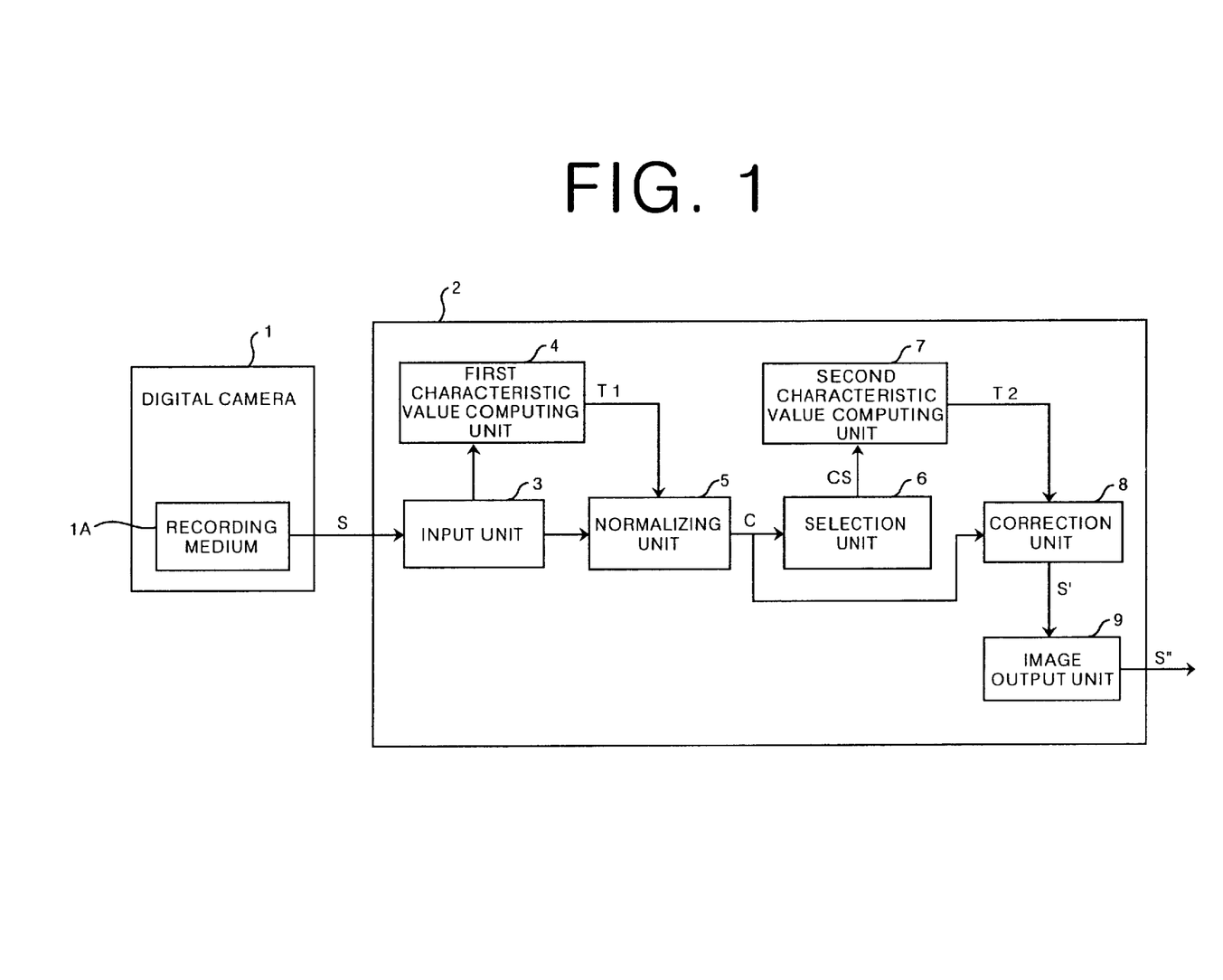
FIG. 1 is a block diagram of an image reproduction system incorporating a first embodiment of the image processing system according to the invention.

FIG. 1 is a block diagram of an image reproduction system incorporating a first embodiment of the image processing system according to the invention. The image processing system, designated by reference numeral 2, is for effecting image processing on digital image data S acquired by a digital camera 1.

The digital camera 1 stores the digital image data S acquired by photographing a subject on a recording medium 1A.

The image processing system 2 includes an input unit 3 for reading the digital image data S from the recording medium 1A, a first characteristic value computing unit 4 for, as explained later, computing first characteristic values T1 characterizing the colors of the image represented by the image processing system 2, a normalizing unit 5 for normalizing the digital image data S based on the first characteristic values T1, as explained later, to produce normalized image data C, a selection unit 6 for producing selected image data CS by selecting from the normalized image data C image data corresponding to a main image portion in the image represented by the digital image data S, a second characteristic value computing unit 7 for computing based on the selected image data CS a second characteristic value T2 characterizing the density of the image represented by the image processing system 2, a correction unit 8 for correcting the normalized image data C based on the second characteristic value T2, as explained later, to produce processed image data S', and an image output unit 9 for outputting the processed image data S' to a printer or the like.

Figure 2:
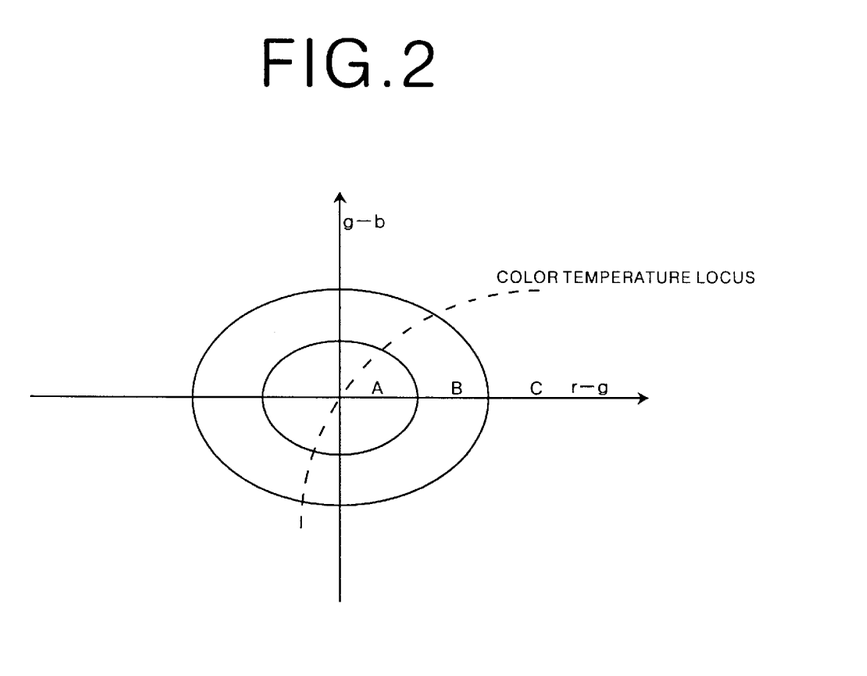
FIG. 2 shows a color coordinate system.

The first characteristic value computing unit 4 analyzes the RGB image signals corresponding to the pixels of the digital image data S by a predetermined method and defines the mean values of RGB image signals selected based on the analytical result as the first characteristic values T1. Specifically, as shown in FIG. 2, a color coordinate system having r-g and g-b axes is established and in computing the mean values the pixels are weighted more heavily with increasing proximity to the origin of the color coordinate system. That is, in the color coordinate system shown in FIG. 2, since the color saturation decreases with increasing proximity to the origin, a region A near the origin, a region B outside the region A and a region c outside the region B are defined, the weighting coefficient by which the pixels located in these regions are multiplied is set as 1.0, 0.5 and 0 in order from the region A to the region C, and the weighted mean values of the RGB image signals multiplied by these values are defined as the first characteristic values T1. As this means that the weighting of the signals increases in proportion as their color saturation decreases, the computed first characteristic values T1 distinctly characterize the image.

The method of computing the first characteristic values T1 in the first embodiment is not limited to the foregoing, however, and any of various other methods can be used instead. For instance, the weighting coefficient can be defined by using a two-dimensional color coordinate system based on b-r and r-g or a two- or three-color coordinate system based on some other combination of r, g and b, or by using a CIE color coordinate system, or by using a color coordinate system based on color saturation signals and color phase signals obtained by dividing the RGB image signals into color saturation signals and color phase signals. Another method that can be used is to define the weighting coefficient to vary in proportion to distance from the origin of a color coordinate system or from a desired color temperature locus defined in a color coordinate system (see FIG. 2). Another is to take lightness into account, i.e., decrease the weighting coefficient with increasing lightness. Another is to vary the weighting coefficient according to the subject or scene. In a scene including the setting sun, for example, the weighting coefficient can be set small at the setting sun portion because it is usually desired to avoid correcting this portion. Another is to use the unweighted mean values as the first characteristic values T1.

It is also possible to generate rough image data by evenly thinning out the pixels of the digital image data S and using the mean values for the rough image data as the first characteristic values T1. By computing the first characteristic values T1 from rough image data in this way, the pixels can be reduced from their usual number between hundreds of thousands and several millions to a number between several thousands and several tens of thousands. This greatly shortens the computation time. In the case of using rough image data, mean values calculated for groups of pixels (e.g., 5×5) can be used as the rough image data, or such rough image data and rough image data obtained by pixel thinning can be used together to enhance the accuracy of the mean values. The digital image data acquired by a digital camera are usually expressed in 8 bits and are therefore relatively coarse. They also include electrical noise on the shadow side. The accuracy of the pixel values can therefore be enhanced by calculating the mean values of pixel groups and using these as the rough image data, although this lengthens the computation time. On the other hand, the method of producing the rough image data by thinning out the pixels of the digital image data S enables quick and easy generation of the rough image data but does not provide very high the pixel value accuracy.

Among the various other methods that can be adopted for obtaining the rough image data are that of uniformly thinning out the pixels of the digital image data S, computing the mean values of pixel values and using the result as the rough image data, and that of calculating the average values of multiple pixel values, thinning out the pixels and using the result as the rough image data.

It is also possible to compute the first characteristic values T1 as logarithmic values. This can be done either by first calculating the antilogarithmic values of the first characteristic values T1 of the digital image data S and then converting them to the logarithmic values or by computing the first characteristic values T1 after logarithmically converting the digital image data S. Also in the case of obtaining the first characteristic values T1 from rough image data, the computation can be effected either by logarithmically converting rough image data or by generating the rough image data after logarithmically converting the digital image data S. The fact that the data obtained by such logarithmic conversion are linear, i.e., not dependent on density, simplifies the processing at the time of correction explained later.

After computing the normalization conditions from the first characteristic values T1, the normalizing unit 5 uses the normalization conditions to normalize the digital image data S into the normalized image data C. The normalization conditions are the conditions by which the digital image data S are converted so that the three color image signals of portions corresponding to gray subject color have equal values (are gray in terms of image data). The normalization conditions are equivalent to the digital image data S color correction conditions.

The normalization conditions are calculated by the following equations:

$$Ccor(R) = \text{Mean}(R) - Mm$$
$$Ccor(G) = \text{Mean}(G) - Mm$$
$$Ccor(B) = \text{Mean}(B) - Mm, \quad (1)$$

where:
Ccor(R), Ccor(G), Ccor(B): Normalization conditions for respective colors;
Mm=(Mean(R)+Mean(G)+Mean(B))/3;
Mean(R), Mean(G), Mean(B): First characteristic values T1 for respective colors.

When the digital image data S and the normalization conditions are logarithmic values, the normalized image data C are obtained by adding the so-calculated normalization conditions Ccor(R), Ccor(G) and Ccor(B) to each pixel of the digital image data S. When they are antilogarithmic values, the normalized image data C are obtained by multiplying each pixel thereby. Although the amount of computation involved in carrying out an addition (or multiplication) operation on every pixels is extremely large, the processing can be speeded up by creating a table defining for each pixel the relationship between the digital image data S and the normalized image data C after normalization by the normalization conditions and generating the normalized image data C with reference to the table. This greatly reduces the volume and increases the speed of the computation compared with the case of effecting a separate arithmetic operation for each of several hundred thousand to several million pixels because, in the case of 8-bit digital image data S, for example, the computation of the table requires only 256×3 arithmetic operations.

The selection unit 6 produces the selected image data CS by selecting from the normalized image data C a main image portion in the image represented by the digital image data S. The main image portion can, for example, be a specified area near the center of the image, a specified area centered on the focal point at time of image-taking, or the face region of a person who is the main subject. Alternatively, a weighting coefficient can be established that in highlight and shadow image regions grows smaller with increasing likelihood of a pixel being a background element and grows larger with increasing likelihood of its being a main subject element, multiplying the normalized image data C by the weighting coefficient and selecting the normalized image data C multiplied by the weighting coefficient as the selected image data CS. Any of various available methods can be used for extracting the face region. These include that taught by Japanese Unexamined Patent Publication No. 52(1977)-156624 for detecting flesh color, that taught by Japanese Unexamined Patent Publication No. 4(1992)-346332 for detecting a face region/from a cluster image of analogous color, and that of Japanese Unexamined Patent Publication No. 8(1996)-122944 detecting a face region by shape. Moreover, since the normalized image data C are color corrected in the present invention, extraction of face regions and identification of neutral colors, sky color, the green of vegetation and like is simple. Separation between background and main subject can therefore be conducted with high precision.

The second characteristic value computing unit 7 computes the three-color mean density of the RGB image signals constituting the normalized image data C and defines the result as the second characteristic value T2. As the selected image data CS are normalized, the three-color mean density defined as the second characteristic value T2 can be computed as an appropriate value unaffected by color. The second characteristic value T2 is used in the correction unit to compute a correction value for giving the reproduced image proper density.

It is also possible to uniformly thin out the pixels of the normalized image data C to generate normalized rough image data and compute the second characteristic value T2 based on selected image data selected from the normalized rough image data. By computing the second characteristic value T2 from rough image data in this way, the pixels can be reduced from their usual number between hundreds of thousands and several millions to a number between several thousands and several tens of thousands. This greatly shortens the computation time. In the case of using rough image data, mean values calculated for groups of pixels (e.g., 5×5) can be used as the rough image data, or such rough image data and normalized rough image data obtained by pixel thinning can be used together to enhance the accuracy of the second characteristic value T2. Among other methods that can be adopted for obtaining the normalized rough image data are that of uniformly thinning out the pixels of the normalized image data C, computing the mean value of multiple pixel values and using the result as the normalized rough image data, and that of calculating the average value of multiple pixel values, thinning out the pixels and using the result as the rough image data.

It is also possible to compute the second characteristic value T2 as a logarithmic value. This can be done either by first calculating the antilogarithmic value of the second characteristic value T2 of the selected image data CS and then converting it to the logarithmic value or by computing the second characteristic value T2 after logarithmically converting the selected image data CS. Also in the case of obtaining the second characteristic value T2 from normalized rough image data, the computation can be effected either by logarithmically converting normalized rough image data or by generating the rough image data after obtaining the selected image data CS by logarithmically converting the normalized image data. The fact that the data obtained by such logarithmic conversion are linear, i.e., not dependent on density, simplifies the processing at the time of correction explained below.

The correction unit 8 processes the second characteristic value T2 to compute a correction value for correcting the normalized image data C and then uses the correction value to correct the normalized image data C and thereby produce the processed image data S'. When the main image portion of the reproduced image is to be reproduced at a density value of 0.70, for example, the correction unit 8 computes the correction value to make the second characteristic value T2 equal to the density value 0.70 (128 by antilogarithmic conversion when 255 is defined as white, which will hereinafter be referred to as the antilogarithmic value to distinguish it from the density value). When the normalized image data C are antilogarithmic values and the value of the main image portion in the normalized image data C is 140, the correction value is 120/140 and the processed image data S' is computed by multiplying every pixel of the normalized image data C by 120/140. When the normalized image data C are density values and the density value of the main image portion in the normalized image data C is 0.8, the correction value is 0.8−0.7=0.1 and the processed image data S' are computed by subtracting 0.1 from every pixel of the normalized image data C. Although the computation can be done separately for each pixel, since the amount of computation is very large by this method, it is, as in the case of computing the normalized image data C, preferable to speed up the processing by creating a table defining for each pixel the relationship between the normalized image data C and the processed image data S' after correction by the correction value and to generate the processed image data S' with reference to the table.

The image output unit 9 corrects the processed image data S' so as to enable a CRT or printer to reproduce the processed image data S' at a prescribed output density. The digital camera 1 effects gradation, color processing and exposure control in conformity with prescribed standards. Therefore, if the reference value of the acquired digital image data S is corrected to a predetermined output density so as to enable direct output to a CRT or printer, the subject can be reproduced with high image quality. For this, the reference value of the processed image data S' obtained by correcting the digital image data S is given a prescribed output density by converting the processed image data S' to the final output image data S" by use of, for example, LUT.

Two methods are available for converting the reference value of the processed image data S'. One is to define the maximum value assumable by the image represented by the processed image data S' (in the case of 8 bits, for example, respective RGB image signal values of 255) and effect conversion so that this reference value becomes white. When the processed image data S' are converted to make the maximum value of the respective RGB image signals (255, 255, 255) white in this way, gray of the subject is reproduced as gray.

Another way is to define the reference value as the mean value of the processed image data S' and to convert the mean value to give it an output density of, for example, 0.70 (128 in the case of an antilogarithmic value). By this method, too, the gray of the subject can be reproduced as gray by reproducing the output image data S".

If desired, a reproduced image of still higher image quality can be obtained by configuring the image output unit 9 to color-correct the processed image data S' by matrix processing or lookup table processing.

The operation of the first embodiment will now be explained.

First, the subject is photographed with the digital camera 1 to acquire the digital image data S and the digital image data S are stored in the recording medium 1A. The input unit 3 of the image processing system 2 reads the digital image data S from the recording medium 1A and sends the digital image data S to the first characteristic value computing unit 4 and the normalizing unit 5. As explained in the foregoing, the first characteristic value computing unit 4 calculates the mean values or weighted mean average values of the digital image data S and defines the result as the first characteristic values T1. The first characteristic value computing unit 4 sends the first characteristic values T1 to the normalizing unit 5, which uses the first characteristic values T1 to normalize the digital image data S (which may be rough image data), thereby producing the normalized image data C, and sends the normalized image data C to the selection unit 6. The selection unit 6 selects the selected image data CS corresponding to the main image region and sends the selected image data CS to the second characteristic value computing unit 7.

As explained above, the second characteristic value computing unit 7 computes the mean value of the selected image data CS and defines the result as the second characteristic value T2. The second characteristic value computing unit 7 sends the second characteristic value T2 to the correction unit 8. The correction unit 8 uses the second characteristic value T2 to compute the correction value for correcting the normalized image data C and uses the correction value to correct the normalized image data C and produce the processed image data S', which it sends to the image output unit 9. The image output unit 9 corrects the processed image data S' to give the reference value thereof a prescribed output density and thereby produce the final output image data S". The output image data S" are sent to a printer, CRT or other reproduction unit to be reproduced as a visible image.

Thus this embodiment first normalizes the digital image data S acquired with the digital camera 1 to produce color-corrected normalized image data C, next processes the selected image data CS corresponding to the main image portion of the normalized image data C to compute the second characteristic value T2 for correcting the density of the normalized image data C, and then uses the second characteristic value T2 to correct the normalized image data C to the desired density. By reproducing the final output image data S", therefore, there can be obtained a reproduced image having the desired colors and density. Even though the type and amount of image processing effected by the digital camera 1 depends on its make and model, the image processing effected on the digital image data S by the invention image processing method and system enable reproduction images having the desired colors and density irrespective of the completeness of the processing effected on the digital image data S in the digital camera 1. This makes it possible to consistently produce high-quality reproduced images.

Although the image processing system 2 is provided separately of the digital camera 1 in this embodiment, the image processing system 2 can instead be incorporated into the digital camera 1.

This embodiment obtains the selected image data CS from the normalized image data C and computes the second characteristic value T2 based on the selected image data CS. The invention is not limited to this arrangement, however, and the second characteristic value T2 can instead be computed directly from the normalized image data C.

This embodiment uses the first characteristic values T1 to normalize the digital image data S and obtain the normalized image data C, obtains the second characteristic value T2 from the normalized image data C and corrects the normalized image data C based on the second characteristic value T2. This invention is not limited to this, however, it is possible instead to obtain correction values for correcting the colors and density of the digital image data S from the first characteristic values T1 and the second characteristic value T2 and to produce the processed image data S' by correcting the digital image data S based on these correction values.

A second embodiment of the invention will now be explained.

Figure 3:
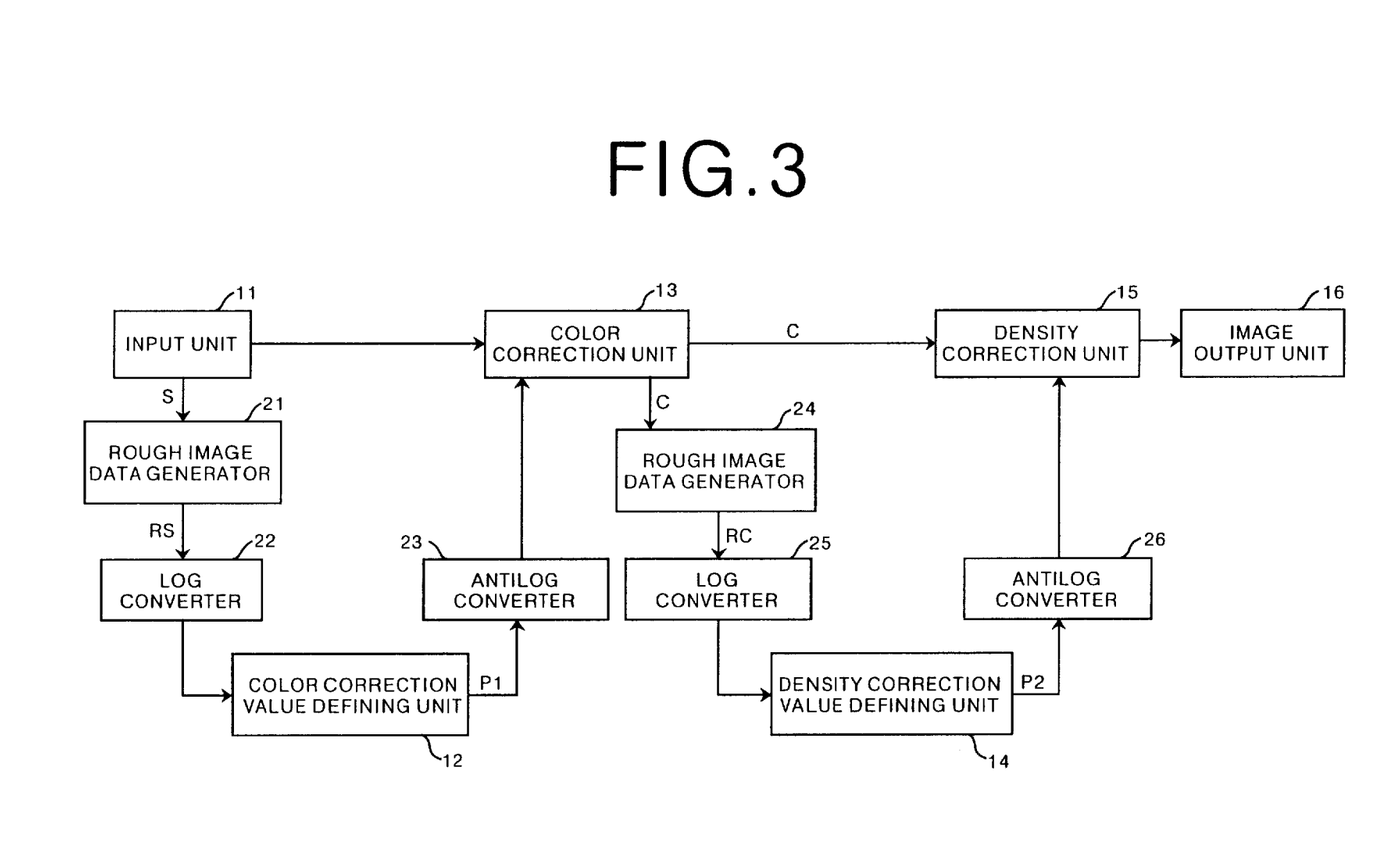
FIG. 3 is a block diagram of an image processing system that is a second embodiment of the invention.

FIG. 3 is a block diagram of an image processing system that is a second embodiment of the invention.

As shown in FIG. 3, the image processing system according to the second embodiment includes an input unit 11, similar to the input unit 3 of the first embodiment, for reading the digital image data S from a recording medium, a rough image data generator 21 for generating rough image data RS by thinning out the pixels of the digital image data S, a log converter 22 for logarithmically converting the rough image data RS, a color correction value defining unit 12 for, based on the logarithmically-converted rough image data RS, computing first characteristic values in a manner similar to that of the first embodiment and defining the result as color correction values P1 for correcting the colors of the digital image data S, an antilog converter 23 for antilogarithmically converting the color correction values P1, a color correction unit 13 for producing normalized image data C by correcting the colors of the digital image data S based on the antilogarithmically-converted color correction values P1, a rough image data generator 24 for producing normalized rough image data RC by thinning out the pixels of the normalized image data C, a log converter 25 for logarithmically converting the normalized rough image data RC, a density correction value defining unit 14 for, based on the logarithmically-converted normalized rough image data RC, computing a second characteristic value in a manner similar to that of the first embodiment and defining the result as a density correction value P2 for correcting the density of the digital image data S, an antilog converter 26 for antilogarithmically converting the density correction value P2, a density correction unit 15 for correcting the density of the normalized image data C based on the density correction value P2 to produce processed image data S', and an image output unit 16 for outputting the processed image data S' to a printer or the like.

The processing operations effected by the color correction value defining unit 12, the color correction unit 13, the density correction value defining unit 14, the density correction unit 15 and the image output unit 16 are substantially the same as those effected by the first characteristic value computing unit 4, the normalizing unit 5, the second characteristic value computing unit 7, the correction unit 8 and the image output unit 9, respectively, of the first embodiment and so will not be described in detail again here. The second embodiment differs from the first in the point that the first characteristic values T1 are computed from the rough image data RS of the digital image data S and the result is defined as the color correction values and the point that the second characteristic value T2 is computed from the normalized rough image data RC of the normalized image data C and the result is defined as the density correction value.

This defining of the color correction values P1 based on the rough image data RS and defining of the density correction value P2 based on the normalized rough image data RC enables the pixels to be reduced from their usual number between hundreds of thousands and several millions to a number between several thousands and several tens of thousands. This greatly shortens the computation time. As the rough image data in this embodiment there can be used mean values calculated for groups of pixels (e.g., 5×5), or such rough image data and rough image data obtained by pixel thinning can be used together to enhance the accuracy of the average values. Among other methods that can be adopted for obtaining the rough image data RS and the normalized rough image data RC are that of uniformly thinning out the pixels of the digital image data S and the normalized image data C, computing the mean value of multiple pixel values and using the result as the rough image data, and that of calculating the average value of multiple pixel values, thinning out the pixels and using the result as the rough image data.

A third embodiment of the invention will now be explained.

Figure 4:
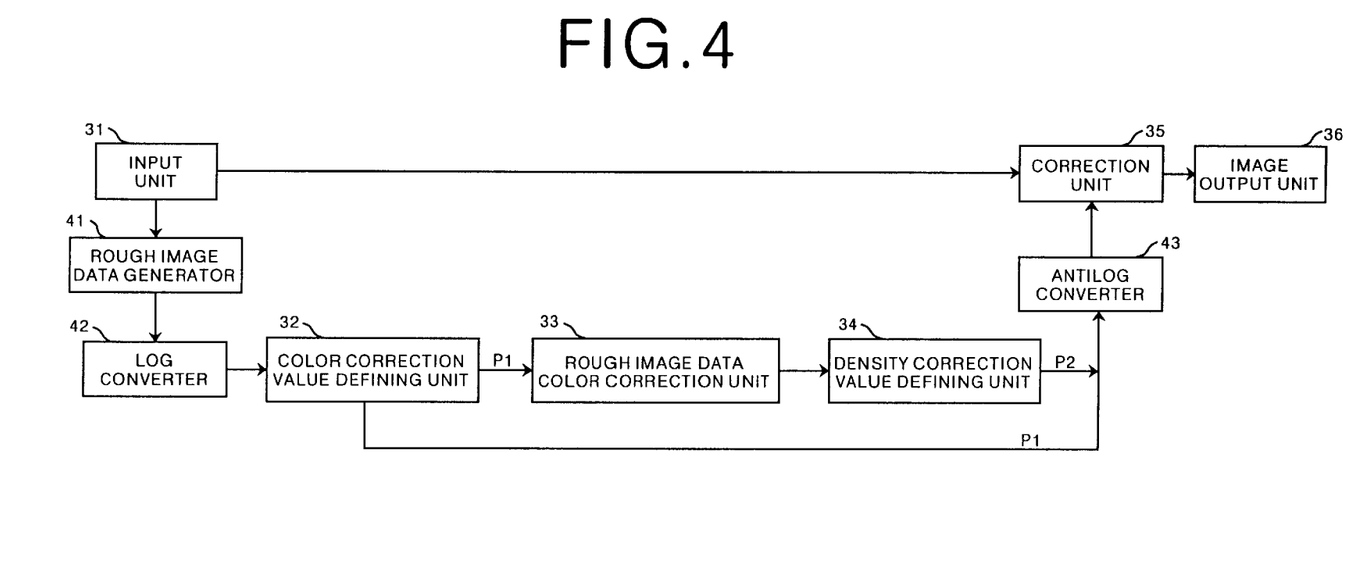
FIG. 4 is a block diagram of an image processing system that is a third embodiment of the invention.

FIG. 4 is a block diagram of an image processing system that is a third embodiment of the invention.

As shown in FIG. 4, the image processing system according to the third embodiment includes an input unit 31, similar to the input unit 3 of the first embodiment, for reading the digital image data S from a recording medium, a rough image data generator 41 for generating rough image data RS by thinning out the pixels of the digital image data S, a log converter 42 for logarithmically converting the rough image data RS, a color correction value defining unit 32 for, based on the logarithmically-converted rough image data RS, computing first characteristic values in a manner similar to that of the first embodiment and defining the result as color correction values P1 for correcting the colors of the digital image data S, a rough image data color correction unit 33 for producing normalized rough image data RC by correcting the rough image data RS based on the color correction values P1, a density correction value defining unit 34 for, based on the normalized rough image data RC, computing a second characteristic value in a manner similar to that of the first embodiment and defining the result as a density correction value P2 for correcting the density of the digital image data S, an antilog converter 43 for antilogarithmically converting the color correction values P1 and the density correction value P2, a correction unit 35 for correcting the colors and the density of the digital image data S based on the color correction values P1 and the density correction value P2 to produce processed image data S', and an image output unit 36 for outputting the processed image data S' to a printer or the like.

The processing operations effected by the color correction value defining unit 32, the color correction unit 33, the density correction value defining unit 34, the correction unit 35 and the image output unit 36 are substantially the same as those effected by the first characteristic value computing unit 4, the normalizing unit 5, the second characteristic value computing unit 7, the correction unit 8 and the image output unit 9, respectively, of the first embodiment and so will not be described in detail again here. The third embodiment differs from the first in the point that the first characteristic values T1 are computed from the rough image data RS of the digital image data S and the result is defined as the color correction values P1, the point that the second characteristic value T2 is computed from the normalized rough image data RC obtained by correcting the rough image data RS by the color correction values P1 and the result is defined as the density correction value P2, and the point that the digital image data S is corrected based on the color correction values P1 and the density correction value P2. The correction unit 35 can be configured either to first correct the colors of the digital image data S based on the color correction values P1 and then correct the density based on the density correction value P2 or to simultaneously correct the colors and density by addition of or multiplication by the color correction values P1 and the density correction value P2.

This defining of the color correction values P1 based on the rough image data RS and defining of the density correction value P2 based on the normalized rough image data RC enables the pixels to be reduced from their usual number between hundreds of thousands and several millions to a number between several thousands and several tens of thousands. This greatly shortens the computation time. As the rough image data in this embodiment there can be used mean values calculated for groups of pixels (e.g., 5×5), or such rough image data and rough image data obtained by pixel thinning can be used together to enhance the accuracy of the average values. Among other methods that can be adopted for obtaining the rough image data are that of uniformly thinning out the pixels of digital image data S, computing the mean value of multiple pixel values and using the result as the rough image data, and that of calculating the average value of multiple pixel values, thinning out the pixels and using the result as the rough image data.

What is claimed is:

1. An image processing method for image-processing digital image data acquired by a digital camera comprising the steps of:
   computing first characteristic values characterizing colors of an image represented by digital image data,
   normalizing the digital image data based on the first characteristic values to produce normalized image data,
   computing from the normalized image data a second characteristic value characterizing density of the image represented by the digital image data, and
   correcting the normalized image data based on the second characteristic value to produce processed image data.

2. An image processing method for image-processing digital image data acquired by a digital camera comprising the steps of:
   computing first characteristic values characterizing colors of an image represented by digital image data,
   normalizing the digital image data based on the first characteristic values to produce normalized image data,
   computing from the normalized image data a second characteristic value characterizing density of the image represented by the digital image data,
   correcting the digital image data based on the first and second characteristic values to produce processed image data.

3. An image processing method according to claim 1 or 2, wherein the first characteristic values are computed from rough image data generated by removing pixels from the digital image data.

4. An image processing method according to claim 1 or 2, wherein the second characteristic value is calculated from normalized rough image data generated by removing pixels from the normalized image data.

5. An image processing method according to claim 1 or 2, wherein the first characteristic values are mean values of the digital image data.

6. An image processing method according to claim 1 or 2, wherein the first characteristic values are weighted mean values based on a weighting coefficient decided from colors of the pixels of the digital image data.

7. An image processing method according to claim 1 or 2, wherein the second characteristic value is a mean value of selected image data corresponding to a main image portion of the image represented by the digital image data.

8. An image processing method according to claim 1 or 2, wherein the processed image data are further corrected based on a reproduction target value representing a characteristic of a reproduction unit for reproducing the digital image data.

9. An image processing method for image-processing digital image data acquired by a digital camera comprising the steps of:
   generating rough image data by removing pixels from digital image data,
   defining color correction values by computing first characteristic values characterizing colors of an image represented by the rough image data,
   normalizing the rough image data based on the color correction values to produce normalized rough image data,
   defining a density correction value by computing from the normalized rough image data a second characteristic value characterizing density of the image represented by the digital image data, and
   correcting the digital image data based on the color correction values and the density correction value to produce processed image data.

10. An image processing method according to claim 9, wherein the first characteristic values are average values of the rough image data.

11. An image processing method according to claim 9, wherein the first characteristic values are weighted mean values based on a weighting coefficient decided from colors of the pixels of the digital image data.

12. An image processing method according to any of claims 9 to 11, wherein the second characteristic value is a mean value of selected image data corresponding to a main image portion of the image represented by the digital image data.

13. An image processing method according to any of claims 9 to 11, wherein the processed image data are further corrected based on a reproduction target value representing a characteristic of a reproduction unit for reproducing the digital image data.

14. An image processing system for image-processing digital image data acquired by a digital camera comprising:
   first characteristic value computing means for computing first characteristic values characterizing colors of an image represented by digital image data,
   normalizing means for normalizing the digital image data based on the first characteristic values to produce normalized image data,
   second characteristic value computing means for computing from the normalized image data a second characteristic value characterizing density of the image represented by the digital image data, and
   correcting means for correcting the normalized image data based on the second characteristic value to produce processed image data.

15. An image processing system for image-processing digital image data acquired by a digital camera comprising:
   first characteristic value computing means for computing first characteristic values characterizing colors of an image represented by digital image data,
   normalizing means for normalizing the digital image data based on the first characteristic values to produce normalized image data,
   second characteristic value computing means for computing from the normalized image data a second characteristic value characterizing density of the image represented by the digital image data, and
   correcting means for correcting the digital image data based on the first and second characteristic values to produce processed image data.

16. An image processing system according to claim 14 or 15, wherein the first characteristic value computing means is means for computing the first characteristic values from rough image data generated by removing pixels from the digital image data.

17. An image processing system according to claim 14 or 15, wherein the second characteristic value computing means is means for computing the second characteristic value from normalized rough image data generated by removing pixels from the normalized image data.

18. An image processing system according to claim 14 or 15, wherein the first characteristic value computing means is means for computing the first characteristic values as mean values of the digital image data.

19. An image processing system according to claim 14 or 15, wherein the first characteristic value computing means is means for computing the first characteristic values as weighted mean values based on a weighting coefficient decided from colors of the pixels of the digital image data.

20. An image processing system according to claim 14 or 15, wherein the second characteristic value computing means is means for computing the second characteristic value as a mean value of selected image data corresponding to a main image portion of the image represented by the digital image data.

21. An image processing system according to claim 14 or 15, further comprising means for correcting the processed image data based on a reproduction target value representing a characteristic of a reproduction unit for reproducing the digital image data.

22. An image processing system for image-processing digital image data acquired by a digital camera comprising:
   rough image data generating means for generating rough image data by removing pixels from the digital image data,
   color correction value defining means for defining color correction values by computing first characteristic values characterizing colors of an image represented by the rough image data,
   normalizing means for normalizing the rough image data based on the color correction values to produce normalized rough image data,
   density correction value defining means for defining a density correction value by computing from the normalized rough image data a second characteristic value characterizing density of the image represented by the digital image data, and
   correcting means for correcting the digital image data based on the color correction values and the density correction value to produce processed image data.

23. An image processing system according to claim 22, wherein the color correction value defining means is means for computing the first characteristic values as mean values of the rough image data.

24. An image processing system according to claim 22, wherein the color correction value defining means is means for computing the first characteristic values as weighted mean values based on a weighting coefficient decided from colors of the pixels of the rough image data.

25. An image processing system according to any of claims 22 to 24, wherein the second characteristic value computing means is means for computing the second characteristic value as a mean value of selected image data corresponding to a main image portion of the image represented by the rough image data.

26. An image processing system according to any of claims 22 to 24, further comprising means for correcting the processed image data based on a reproduction target value representing a characteristic of a reproduction unit for reproducing the digital image data.

* * * * *